(12) United States Patent
Ho

(10) Patent No.: US 8,970,974 B2
(45) Date of Patent: Mar. 3, 2015

(54) LENS ADAPTER

(71) Applicant: Global Boom International Limited, Kowloon (HK)

(72) Inventor: Chung Man Peter Ho, Kowloon (HK)

(73) Assignee: Global Boom International Limited, Kowloon (HK)

( * ) Notice: Subject to any disclaimer, the term of this patent is extended or adjusted under 35 U.S.C. 154(b) by 0 days.

(21) Appl. No.: 13/937,002

(22) Filed: Jul. 8, 2013

(65) Prior Publication Data

US 2015/0009585 A1   Jan. 8, 2015

(51) Int. Cl.
*G02B 7/02* (2006.01)

(52) U.S. Cl.
USPC ............ 359/827; 359/828; 359/811; 359/819

(58) Field of Classification Search
USPC ................................ 359/694–700, 811–830
See application file for complete search history.

(56) References Cited

U.S. PATENT DOCUMENTS

| 5,652,921 A * | 7/1997 | Kawano ........................ 396/71 |
| 8,678,676 B2 * | 3/2014 | Scholz et al. ................. 396/342 |

* cited by examiner

*Primary Examiner* — Mohammed Hasan
(74) *Attorney, Agent, or Firm* — Raymond R. Ferrera; Adams and Reese LLP

(57) ABSTRACT

A lens adapter is provided, comprising a cylindrical base, one end of the base is provided with a first mounting seat for connecting with a lens and a manual aperture controlling ring sheathed on the base, the other end of the base is provided with a second mounting seat for connecting with a camera. The lens adapter also comprises an adjusting mechanism connected to a lens aperture controlling rod and the manual aperture controlling ring. The manual aperture controlling ring is adjusted by the adjusting mechanism to make the rotation angle of the manual aperture controlling ring linearly proportional to the size variation of the lens aperture. The lens adapter allows the rotation angle of the manual aperture controlling ring linearly proportional to the size variation of the lens aperture in a manner of synchronously changing, thus facilitating the user to control the lens aperture.

10 Claims, 4 Drawing Sheets

LENS ADAPTER

FIELD OF THE INVENTION

The present invention relates to a lens adapter, more specifically, relates to a lens adapter to adapt the lens to different cameras.

BACKGROUND OF THE INVENTION

Some cameras currently on the market are equipped with detachable lenses or sold without lenses, such as SLR or micro-SLR cameras. Such cameras can be equipped with different lenses according to different shooting demands and effects. But if the lens chosen has a different brand from the camera body or doesn't correspond to the specification of the camera body, the lens and the camera body are not matched. Typically photography professionals and enthusiasts may choose a professional Nikon (a brand name) SLR lens, but Nikon's SLR lens does not fit in all cameras, which has limited its application field. In such cases, a lens adapter can be adopted, one end of which is mounted with a lens and the other end of which is mounted on the camera body so that SLR lens can be installed in a greater variety of cameras through the lens adapter.

In most cases, a latch member is provided on the inside track of the manual aperture controlling ring in the lens adapter and plug and plugged with the lens aperture controlling rod, as the stroke of the lens aperture controlling rod on the lens is limited within an arc-shaped slot whose center is on the central axis of the lens and coincident with the central axis of the manual aperture controlling ring, the rotation angle of the manual aperture controlling ring is completely consistent with the moving angle of the lens aperture controlling rod. However, the moving angle of the lens aperture controlling rod is not linearly proportional to the opening-and-closing of the aperture blades (the change in size of the aperture), so the rotation angle of the manual aperture controlling ring is not linearly proportional to the change in size of the aperture. The aperture may change little when the rotation angle is large, or the aperture may change significantly when the rotation angle is small, which may lead to inconvenience for the user to control the change in size of the aperture through the manual aperture controlling ring.

BRIEF SUMMARY OF THE INVENTION

The objective of the present invention is to provide a lens adapter with an adjusting mechanism to make the rotation angle of the manual aperture controlling ring linearly proportional to the change in size of the aperture through the compensation adjustment of the adjusting mechanism, aiming at the above drawbacks in the prior art.

The technical solutions to solve the technical problem are as follows: A lens adapter is provided which comprises a cylindrical base, one end of the base is provided with a first mounting seat for connecting with a lens and a manual aperture controlling ring sheathed on the base, the other end of the base is provided with a second mounting seat for connecting with a camera, wherein, the lens adapter further comprises an adjusting mechanism connected to a lens aperture controlling rod and the manual aperture controlling ring, the manual aperture controlling ring is adjusted by the adjusting mechanism to make the rotation angle of the manual aperture controlling ring linearly proportional to the size variation of the lens aperture.

In the lens adapter of the present invention, the adjusting mechanism comprises a barrier fixed on the manual aperture controlling ring and a driven portion set on the base, the driven portion is connected to the lens aperture controlling rod, the edge of the barrier remains tangent to the driven portion, and the driven portion is driven to move by the change of the edge shape of the barrier.

In the lens adapter of the present invention, the barrier is an arc of slice which comprises a narrow end and a broad end, the lateral border of the barrier is fixed on the manual aperture controlling ring, the medial border of the barrier is a special curve extending from the narrow end to the broad end and protruding to the inside of the manual aperture controlling ring, the medial border contacts the driven portion at its narrow end.

In the lens adapter of the present invention, an indentation for accommodating the medial border of the barrier and the driven portion is provided at the end of the base where the manual aperture controlling ring is installed, the driven portion comprises a rotating axis fixed in the indentation of the base, a fitting portion that keeps contact with the medial border of the barrier, and a controlling portion connected to the lens aperture controlling rod.

In the lens adapter of the present invention, if the driven portion and the barrier are not in a single plane parallel to the plane that the manual aperture controlling ring resides in, the fitting portion is a column protruding from the driven portion to the barrier, the medial border of the barrier contacts with the column periphery of the fitting portion.

In the lens adapter of the present invention, if the controlling portion of the driven portion and the lens aperture controlling rod are not in a single plane parallel to the plane that the manual aperture controlling ring resides in, the controlling portion is a column protruding from the driven portion to the lens aperture controlling rod, the peripheral contour of the column contacts with the lens aperture controlling rod to adjust the aperture size of the lens through driving the lens aperture controlling rod to move.

In the lens adapter of the present invention, the peripheral contour of the column of the controlling portion in the driven portion fits with the outer contour of the lens aperture controlling rod.

In the lens adapter of the present invention, a resetting spring member is provided on the driven portion.

In the lens adapter of the present invention, an annular clamping groove matched with a clamping ring of the lens is provided on the first mounting seat, an annular card member matched with an annular card slot of the camera is provided on the second mounting seat.

In the lens adapter of the present invention, the first mounting seat, the second mounting seat and the base are integrally formed.

When implementing the lens adapter of the present invention, the following advantageous effects can be achieved. The manual aperture controlling ring can control the lens aperture controlling rod via the adjusting mechanism, the adjusting mechanism comprises a barrier fixed on the manual aperture controlling ring and a driven portion set on the base, wherein the driven portion is driven by the barrier. The driven portion is connected to the lens aperture controlling rod, the side edge of the barrier forms a special curve and remains tangent to the driven portion, and the driven portion is driven to move by the change of the width of the barrier, thus driving the lens aperture controlling rod to move. The configuration of the special curve can adjust and compensate for the stroke of the lens aperture controlling rod to make the rotation angle of the manual aperture controlling ring and the aperture size of the lens change synchronously and linearly proportionally, thus making it convenient for the user to control and operate the aperture of the lens.

BRIEF DESCRIPTION OF THE DRAWINGS

The present invention will be further described with reference to the accompanying drawings and embodiments in the following, in the accompanying drawings.

Figure 1:
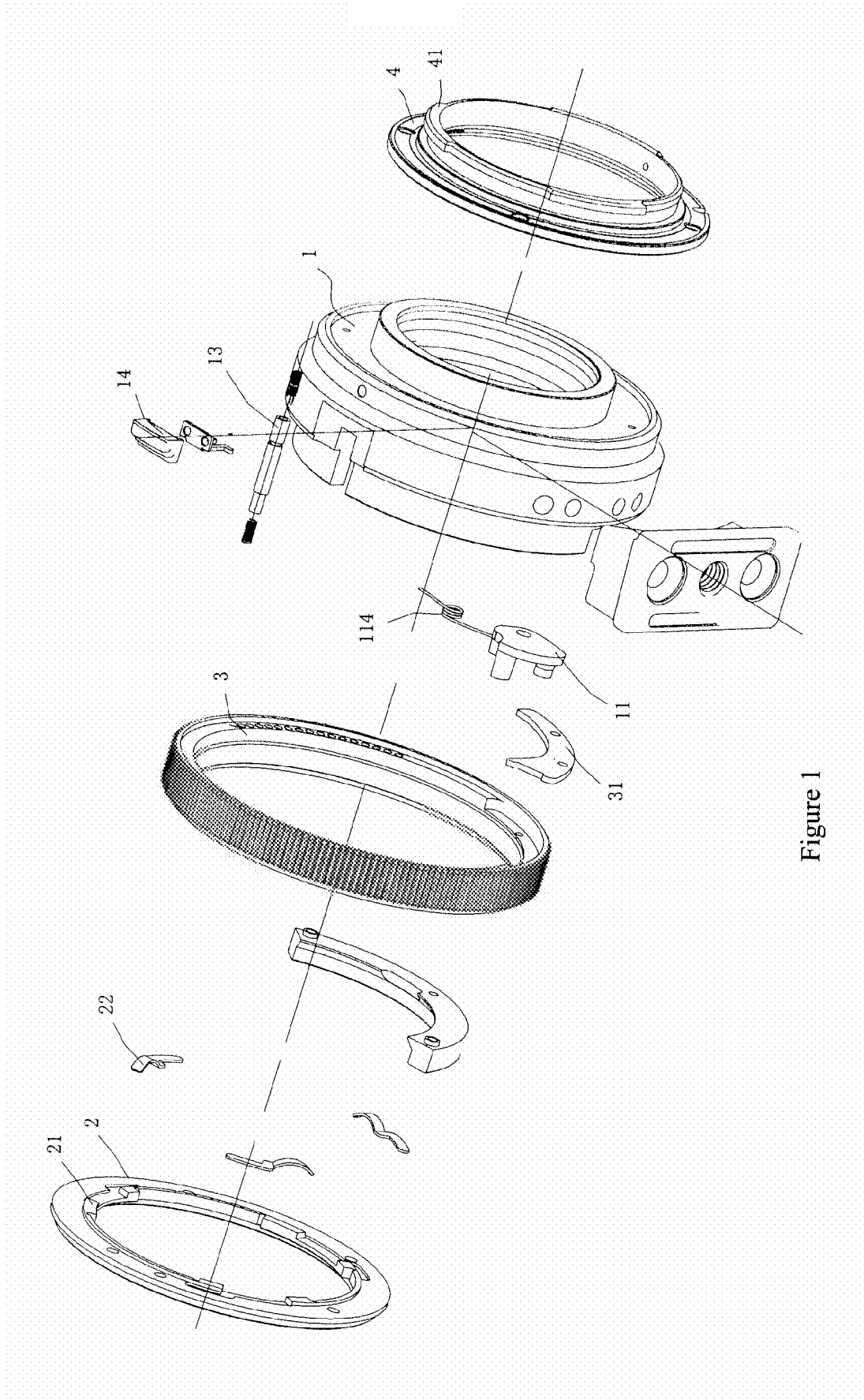
FIG. 1 is an explosive block diagram for a lens adapter according to a preferred embodiment of the present invention.

In the figures,
base 1
first mounting seat 2
manual aperture controlling ring 3
second mounting seat 4
lens 5
driven portion 11
indentation 12
post rod 13
button 14
annular clamping groove 21
spring piece 22
barrier 31
annular card member 41
lens aperture controlling rod 51
rotating axis 111
fitting portion 112
controlling portion 113
spring member 114
narrow end 311
broad end 312
lateral border 313
medial border 314

DETAILED DESCRIPTION OF THE PREFERRED EMBODIMENT

To make the objects, technical schemes and advantages more clearly, the present invention may be further described in detail with reference to the accompanying drawings and embodiments.

Figure 2:
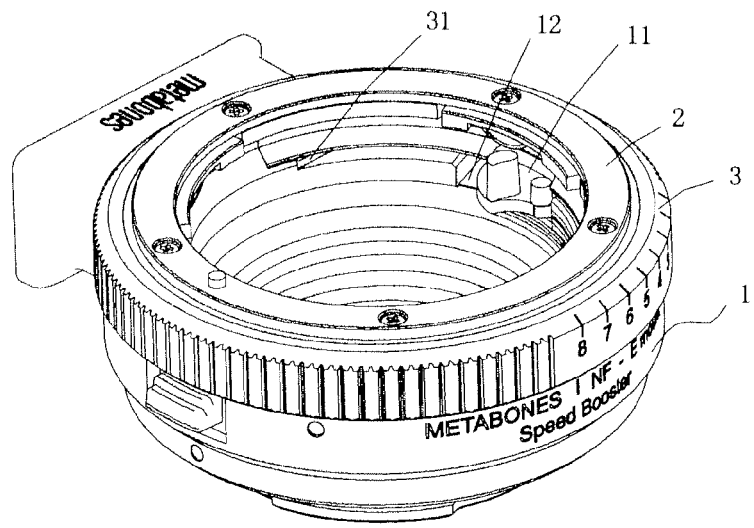
FIG. 2 is a diagram for the lens adapter of the present invention.
Figure 3:
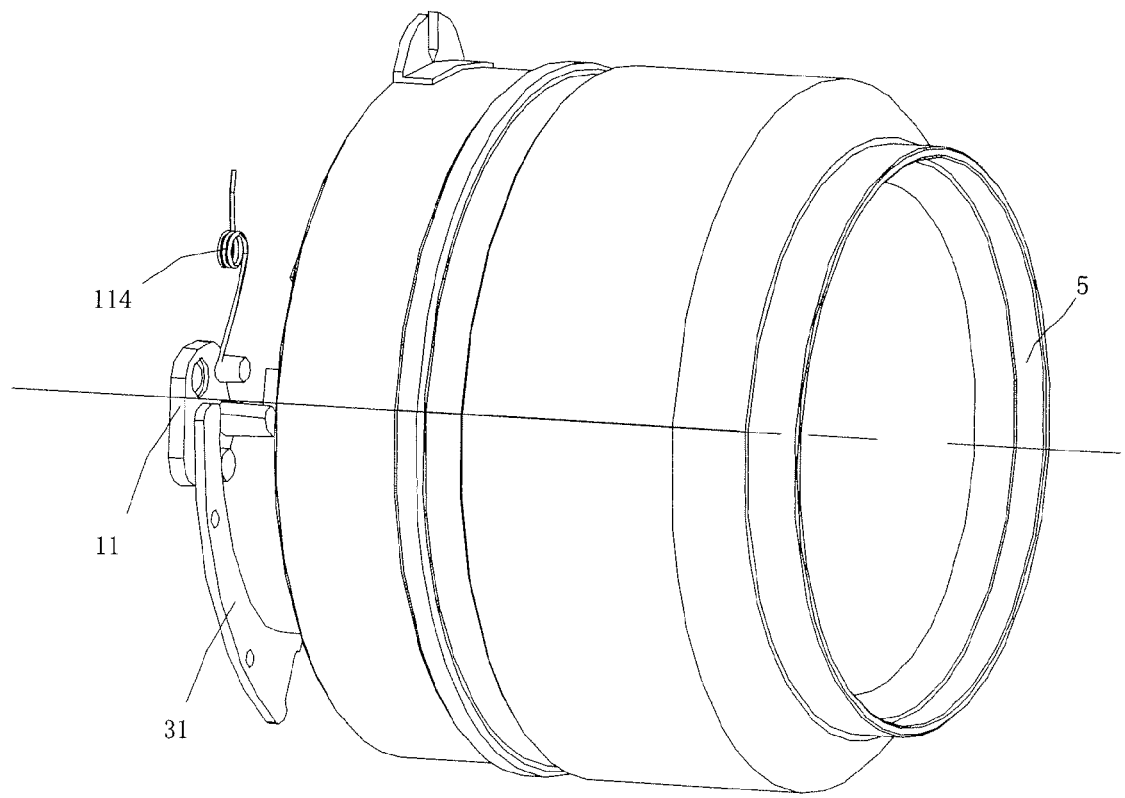
FIG. 3 is a diagram for the matching between the adjusting mechanism in the lens adapter and the lens of the present invention.
Figure 4:
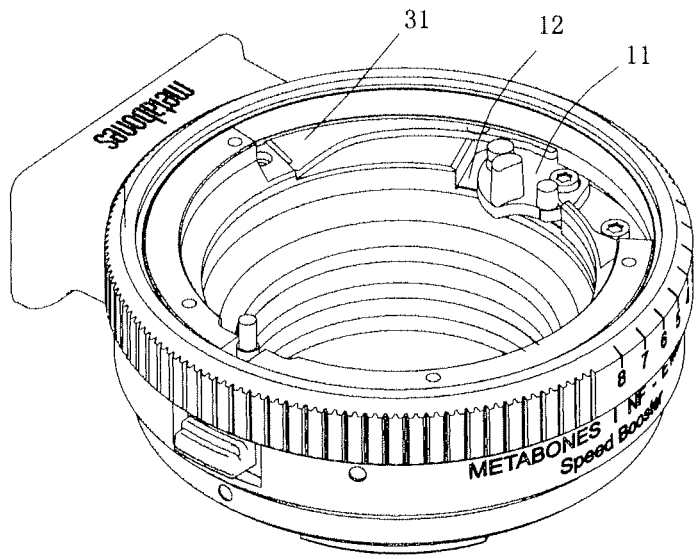
FIG. 4 is a diagram for the lens adapter of the present invention, in which case the driven portion and the narrow end of the barrier are in contact.
Figure 5:
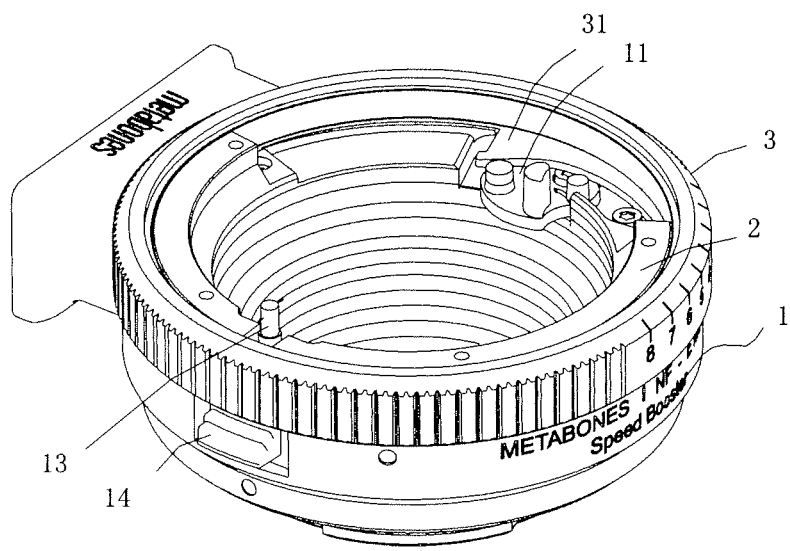
FIG. 5 is a diagram for the lens adapter of the present invention, in which the driven portion and the broad end of the barrier are in contact.
Figure 6:
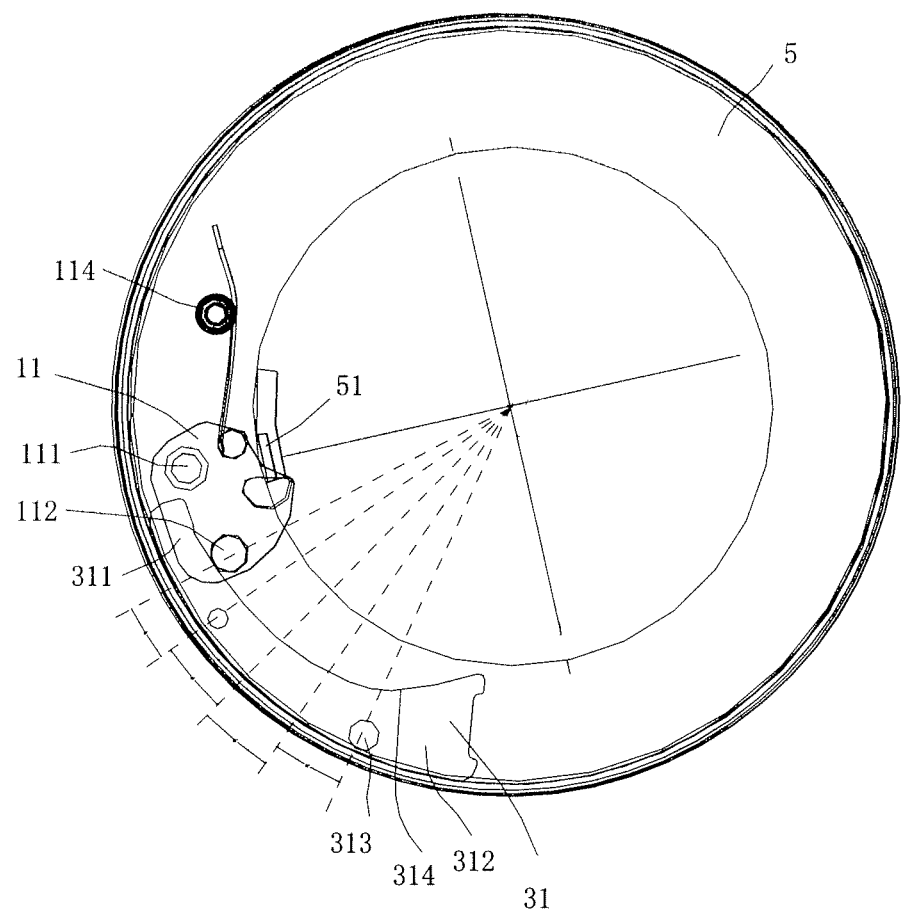
FIG. 6 is a diagram for the matching between the mechanism in the lens adapter and the lens aperture controlling rod of the present invention.

Referring to FIGS. 1-6, the lens adapter comprises a cylindrical base 1, one end of the base 1 is provided with a first mounting seat 2 for connecting with a lens 5 and a manual aperture controlling ring 3 sheathed on the base 1, the other end of the base 1 is provided with a second mounting seat 4 for connecting with a camera. The lens adapter further comprises an adjusting mechanism connected to a lens aperture controlling rod 51 and the manual aperture controlling ring 3, the rotation angle of the manual aperture controlling ring 3 can be linearly proportional to the size variation of the lens aperture through the adjustment and compensation by the adjusting mechanism.

Referring to FIGS. 2-6, the adjusting mechanism comprises a barrier 31 fixed on the manual aperture controlling ring 3 and a driven portion 11 set on the base 1, wherein the driven portion 11 is driven by the barrier 31, and the driven portion 11 is connected to the lens aperture controlling rod 51. The barrier 31 is an arc of slice which comprises a narrow end 311 and a broad end 312, the lateral border 313 of the barrier 31 is fixed on the manual aperture controlling ring 3, the medial border 314 of the barrier 31 protrudes to the inside of the manual aperture controlling ring 3 and forms a special curve resulted from the change of the width, and the medial border 314 keeps contacts with the driven portion 11. Firstly, the medial border 314 of the barrier 31 contacts the driven portion 11 at its narrow end 311, then the contacting part between the medial border 314 and the driven portion 11 changes from the narrow end 311 to the broad end 312 as the manual aperture controlling ring 3 rotates, the driven portion 11 is driven to move by the change of the width of the barrier 31, thus driving the lens aperture controlling rod 51 connected to the driven portion 11 to move to change the size of the d lens aperture.

In the case, the medial border 314 of the barrier 31 is not coincident with the inside track of the manual aperture controlling ring 3, which changes the synchronization between the angle of the manual aperture controlling ring 3 and that of the lens aperture controlling rod 51. Furthermore, it can be found that the lens aperture controlling rod 51 is not linearly proportional to the change of the aperture size. Indeed, in one case, the moving angle of the lens aperture controlling rod 51 in a stroke is small while the size of the aperture changes significantly, but in another case, the moving angle of the lens aperture controlling rod 51 in another stroke is large while the size of the aperture changes little. Different curves can be configured according to the change of the aperture size resulted from different strokes. For example, a curve may be configured gentle based on the stroke of the lens aperture controlling rod 51 in the first case, so that the rotation angle of the manual aperture controlling ring 3 is larger, the width of the barrier 31 changes little, the displacement of the driven portion 11 and the moving angle of the lens aperture controlling rod 51 are larger, and correspondingly the size of the aperture changes significantly. Another curve may be configured steeper based on the stroke in the second case, so that the rotation angle of the manual aperture controlling ring 3 is smaller, the width of the barrier 31 changes significantly, the displacement of the driven portion 11 and the moving angle of the lens aperture controlling rod 51 are larger, and correspondingly the size of the aperture changes little. Referring to FIG. 7, such sections of curves constitute a special curve to make the rotation angle of the manual aperture controlling ring 3 and the aperture size of the lens 5 change synchronously and linearly proportionally, thus making it convenient for the user to control and operate the aperture of the lens 5.

Further, an indentation 12 for accommodating the medial border 314 of the barrier 31 and the driven portion 11 is provided at the end of the base 1 where the manual aperture controlling ring 3 is installed. Referring to FIG. 7, the driven portion 11 comprises a rotating axis 111 fixed in the indentation 12 of the base 1, a fitting portion 112 that keeps contact with the medial border 314 of the barrier 31, and a controlling portion 113 connected to the lens aperture controlling rod 51. The fitting portion 112 of the driven portion 11 is driven by the barrier 31 to make the driven portion 11 rotate with respect to the rotating axis 111, thus the controlling portion 113 of the driven portion 11 pushing the lens aperture controlling rod 51 to move.

If the driven portion 11 and the barrier 31 are not in a single plane parallel to the plane that the manual aperture controlling ring 3 resides in, the fitting portion 112 is a column protruding from the driven portion 11 to the barrier 31, the medial border 314 of the barrier 31 contacts with the column periphery of the fitting portion 112. If the controlling portion 113 of the driven portion 11 and the lens aperture controlling rod 51 are not in a single plane parallel to the plane that the manual aperture controlling ring 3 resides in, the controlling portion 113 is a column protruding from the driven portion 11 to the lens aperture controlling rod 51, the peripheral contour of the column contacts with the lens aperture controlling rod 51 to adjust the aperture size of the lens 5 through pushing the lens aperture controlling rod 51 to move. The move of the lens aperture controlling rod 51 is defined in a curved slot on the lens 5, the location of the controlling portion 113 in the driven portion 11 corresponds to that of the lens aperture controlling rod 51 equipped with lens 5, the controlling portion 113 is in contact with the lens aperture controlling rod 51 to adjust the aperture size of the lens 5 through pushing the lens aperture controlling rod 51 to move. The part of contour of the controlling portion 113 in the driven portion 11 which is in contact with the lens aperture controlling rod 51 fits with the outer contour of the lens aperture controlling rod 51.

A resetting spring member 114 in the reverse direction is provided on the driven portion 11. Driven by the width of the barrier which changes from narrow to broad, the lens aperture controlling rod 51 is pushed to move. But conversely, the barrier changes from broad to narrow when the manual aperture controlling ring 3 is rotated reversely, a gap may occur between the medial border 314 of the barrier 31 and the fitting portion 112 of the driven portion 11, in which case the driven portion 11 can't go back to the original position automatically. At the moment, the resetting spring member 114 should be adopted to move in the reserve direction to help it go back to the original position.

The first mounting seat 2 is an annular member which is fixed on one end of the base 1. Several clamping rings are set on the back of the lens 5 at certain intervals, and several annular clamping groove 21 interleaved with the clamping rings are provided on the first mounting seat 2. Some spring pieces 22 are provided in parallel in the annular clamping groove 21. The clamping rings for lens 5 are put into the vacuums between the annular clamping grooves 21. Then, the lens 5 can be rotated with respect to the lens adapter, the clamping rings for lens 5 may be clamped into the annular clamping grooves 21 to press the spring pieces 22 in the annular clamping grooves 21, the clamping rings for lens 5 can be pressed against by the elastic deformation of the spring pieces 22, thus the lens 5 being locked and mounted onto the lens adapter. A post rod 13 is also provided on the seat 1, the post rod 13 passes across the first mounting set 2 and resists against the back of the lens 5. The post rod 13 is connected to an operating button 14 that is located outside the periphery of the base 1. When the operating button is pressed down, the post rod 13 will resist against the back of the lens 5 to make the clamping rings for lens 5 press the spring pieces 22 in the annular clamping grooves 21 until the spring pieces 22 are completely stretched straight. Then the clamping rings for lens 5 can be extracted from the annular clamping grooves 21 to make the lens 5 apart from the lens adapter.

The second mounting seat 4 is an annular member which is fixed on the other end of the base 1. An annular card member 41 interleaved with an annular card slot of the camera (not shown) is provided on the second mounting seat 4. Correspondingly, the annular card member 41 on the second mounting seat 4 can be put into the vacuum in the annular card slot for of the camera. Then the base 1 can be rotated with respect to the camera, the annular card member 41 will be clamped into the annular card slot of the camera to install the mounting end of the lens adapter on the camera.

Obviously, the first mounting seat 2, the second mounting seat 4 and the base 1 can be integrally formed.

While the present invention has been described with reference to preferred embodiments, however, the present invention is not limited to above-mentioned embodiments, those modifications, improvements and equivalent substitutions, which don't depart from the scope of the spirit and the principle of the present invention, should be included within the scope of the present invention.

The invention claimed is:

1. A lens adapter comprises a cylindrical base, one end of the base is provided with a first mounting seat for connecting with a lens and a manual aperture controlling ring sheathed on the base, the other end of the base is provided with a second mounting seat for connecting with a camera, wherein, the lens adapter further comprises an adjusting mechanism connected to a lens aperture controlling rod and the manual aperture controlling ring, the manual aperture controlling ring is adjusted by the adjusting mechanism to make the rotation angle of the manual aperture controlling ring linearly proportional to the size variation of the lens aperture.

2. The lens adapter according to claim 1, wherein, the adjusting mechanism comprises a barrier fixed on the manual aperture controlling ring and a driven portion set on the base, the driven portion is connected to the lens aperture controlling rod, the edge of the barrier remains tangent to the driven portion, and the driven portion is driven to move by the change of the edge shape of the barrier.

3. The lens adapter according to claim 2, wherein, the barrier is an arc of slice which comprises a narrow end and a broad end, the lateral border of the barrier is fixed on the manual aperture controlling ring, the medial border of the barrier is a special curve extending from the narrow end to the broad end and protruding to the inside of the manual aperture controlling ring, the medial border contacts the driven portion at its narrow end.

4. The lens adapter according to claim 3, wherein, an indentation for accommodating the medial border of the barrier and the driven portion is provided at the end of the base where the manual aperture controlling ring is installed, the driven portion comprises a rotating axis fixed in the indentation of the base, a fitting portion that keeps contact with the medial border of the barrier, and a controlling portion connected to the lens aperture controlling rod.

5. The lens adapter according to claim 4, wherein, if the driven portion and the barrier are not in a single plane parallel to the plane that the manual aperture controlling ring resides in, the fitting portion is a column protruding from the driven portion to the barrier, the medial border of the barrier contacts with the column periphery of the fitting portion.

6. The lens adapter according to claim 4, wherein, if the controlling portion of the driven portion and the lens aperture controlling rod are not in a single plane parallel to the plane that the manual aperture controlling ring resides in, the controlling portion is a column protruding from the driven portion to the lens aperture controlling rod, the peripheral contour of the column contacts with the lens aperture controlling rod to adjust the aperture size of the lens through driving the lens aperture controlling rod to move.

7. The lens adapter according to claim 6, wherein, the peripheral contour of the column of the controlling portion in the driven portion fits with the outer contour of the lens aperture controlling rod.

8. The lens adapter according to claim 4, wherein, a resetting spring member is provided on the driven portion.

9. The lens adapter according to claim 1, wherein, an annular clamping groove matched with a clamping ring of the lens is provided on the first mounting seat, an annular card member matched with an annular card slot of the camera is provided on the second mounting seat.

10. The lens adapter according to claim 1, wherein, the first mounting seat, the second mounting seat and the base are integrally formed.

\* \* \* \* \*